April 6, 1954

W. MESSINGER ET AL 2,674,222

REMOTE-CONTROL NIP ADJUSTMENT AND SEQUENCE
OF NIP CLOSURE CONTROL

Filed June 6, 1950

INVENTORS.
WILLIAM MESSINGER
JOSEPH VOLKMANN
BY
Campbell, Brumbaugh, * ***
THEIR ATTORNEYS.

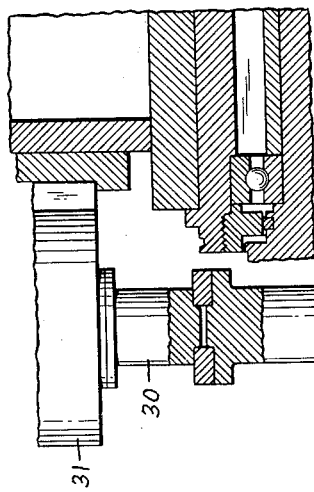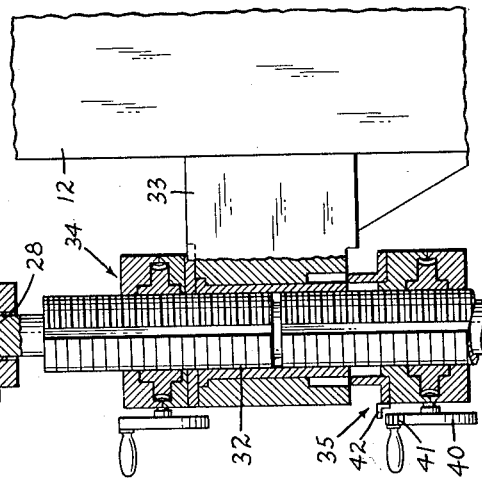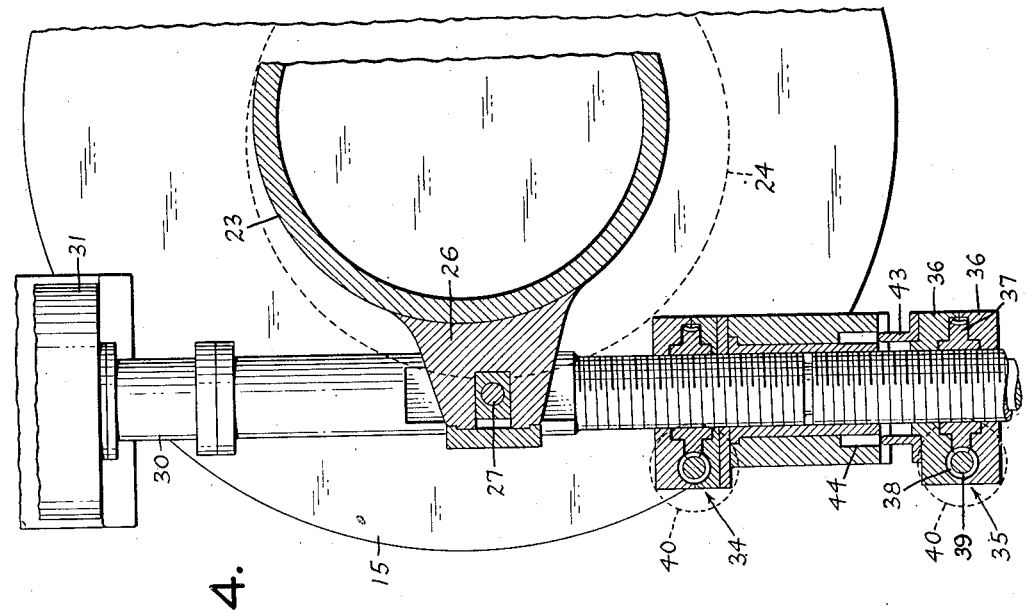

INVENTORS.
WILLIAM MESSINGER
JOSEPH VOLKMANN
BY
THEIR ATTORNEYS.

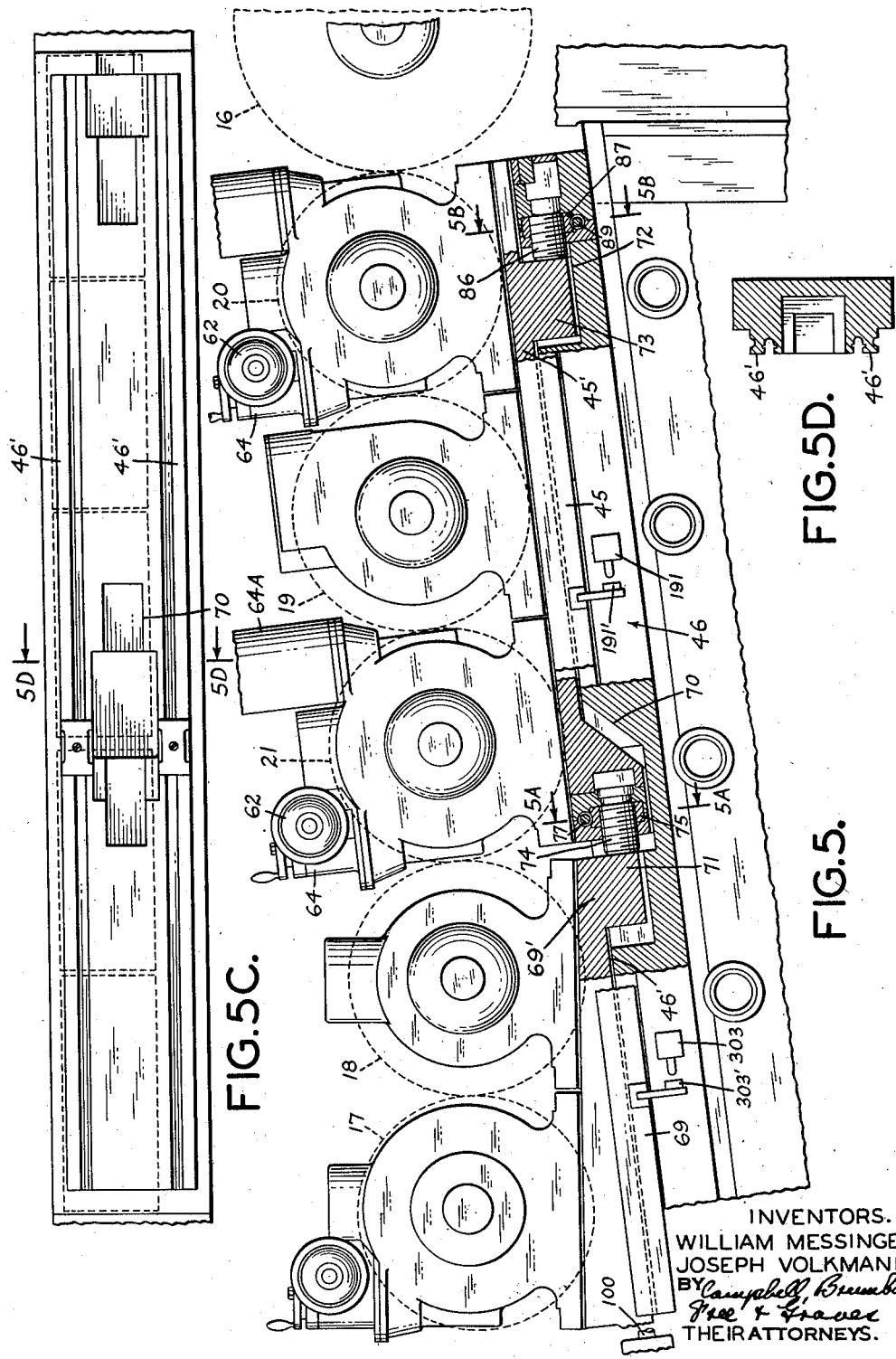

INVENTORS.
WILLIAM MESSINGER
JOSEPH VOLKMANN
BY
THEIR ATTORNEYS.

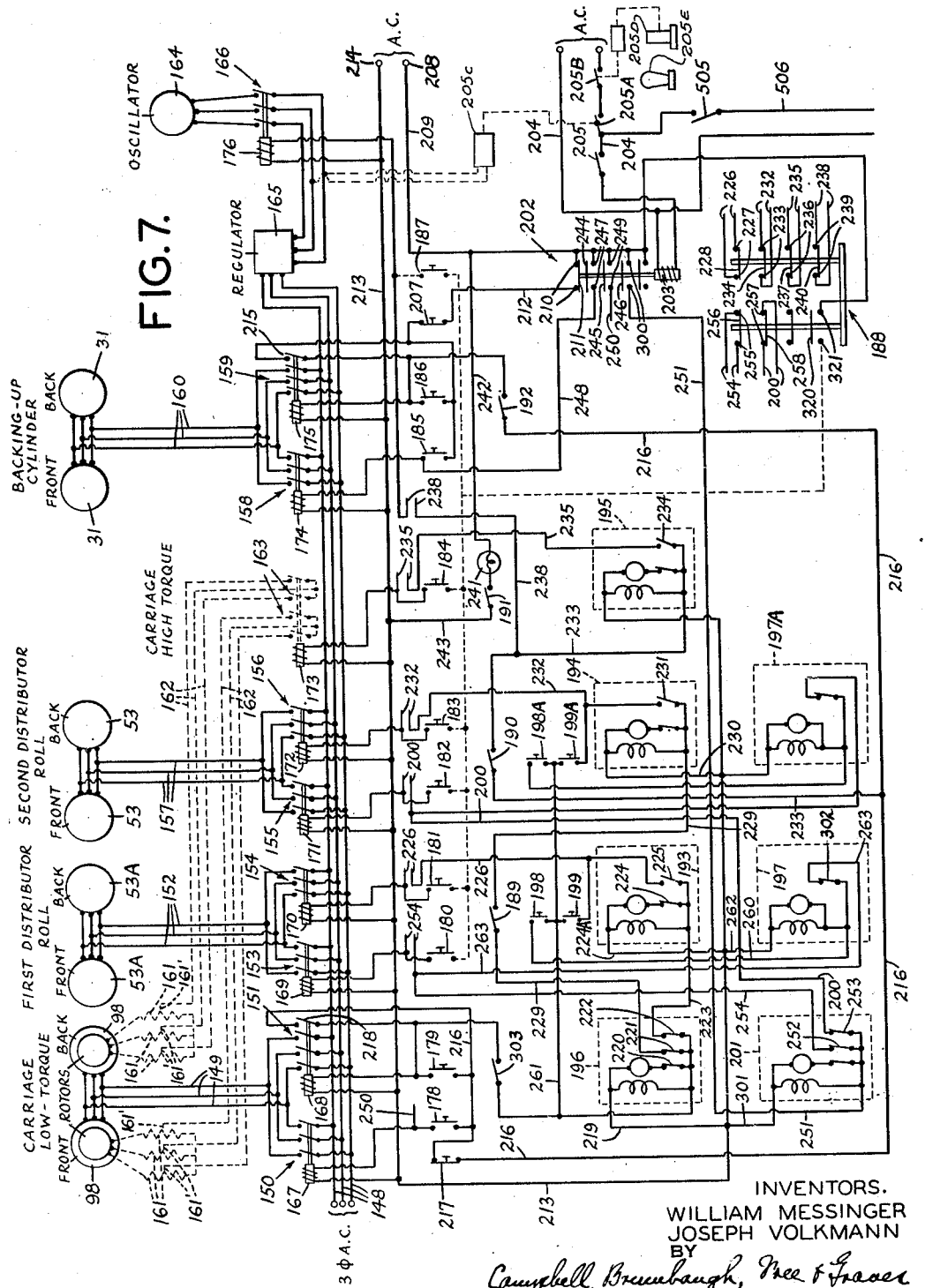

Patented Apr. 6, 1954

2,674,222

UNITED STATES PATENT OFFICE 2,674,222

REMOTE-CONTROL NIP ADJUSTMENT AND SEQUENCE OF NIP CLOSURE CONTROL

William Messinger, Philadelphia, Pa., and Joseph Volkmann, Erlton, N. J., assignors, by mesne assignments, to St. Regis Paper Company, New York, N. Y., a corporation of New York Application June 6, 1950, Serial No. 166,404

30 Claims. (Cl. 118—10)

1

The present invention relates to apparatus for adjusting the "nip" or spacing between the opposed faces of adjacent rolls in apparatus of the type employed for applying a coating to a moving web of paper, or the like, for example. More specifically, it has to do with new and improved control means which enables the "nip" between adjacent rolls to be adjusted accurately and in a simple and highly effective manner.

In certain types of paper making machines such as coaters, for example, it is necessary to maintain certain nip adjustments between adjacent rolls in the apparatus to a relatively high degree of accuracy. Because of the size, weight and number of rolls employed in such apparatus, accurate adjustment of the nips between adjacent rolls has been, heretofore, a difficult and time consuming operation. Also, the maintenance of the proper nip adjustments after they have once been established presents troublesome problems.

It is an object of the invention, accordingly, to provide new and improved apparatus for adjusting the nip between adjacent rolls which is highly accurate yet simple and reliable in operation.

A further object of the invention is to provide new and improved nip adjusting apparatus of the above character by means of which the nip between adjacent rolls can be accurately adjusted from a remote point with a minimum of effort by the operating personnel.

Still another object of the invention is to provide new and improved nip adjusting apparatus of the above character in which adjustable stop means for governing the distance between the shaft centers of adjacent rolls may conveniently be set to given positions from a remote control point, means also being provided at the control point for indicating the positions of the stop means.

Yet another object of the invention is to provide new and improved nip adjusting apparatus having means whereby a desired nip setting between adjacent rolls may be quickly and accurately restored after the rolls have been separated.

Another object of the invention is to provide new and improved nip adjusting apparatus of the above character which enables the nips between adjacent pairs of rolls in apparatus such as a paper web coater, for example, to be closed automatically in a predetermined sequence, and to be opened automatically when a power failure, break in the web, or the like occurs.

A still further object of the invention is to

2 provide new and improved nip adjusting apparatus in which the several nips between adjacent rolls in a group may be opened or closed individually, as desired.

The invention may be better understood from the following detailed description of a typical embodiment thereof, taken in conjunction with the accompanying drawings in which:

Fig. 4 is a view in side elevation of the apparatus employed for adjusting the axis of the backing-up roll with respect to the applicator roll;

Fig. 4A is a front view, partially in section, of the apparatus shown in Fig. 4;

Fig. 5 is a view in side elevation, partly in section, of the lower tier distributor roll and fountain roll carriages and of the ways on which they are mounted;

Fig. 5C is a plan view of one of the ways on which the distributor roll and fountain roll carriages for the upper tier are mounted;

Fig. 5D is a view in transverse section taken along line 5D—5D of Fig. 5C, looking in the direction of the arrows;

Figure 1:
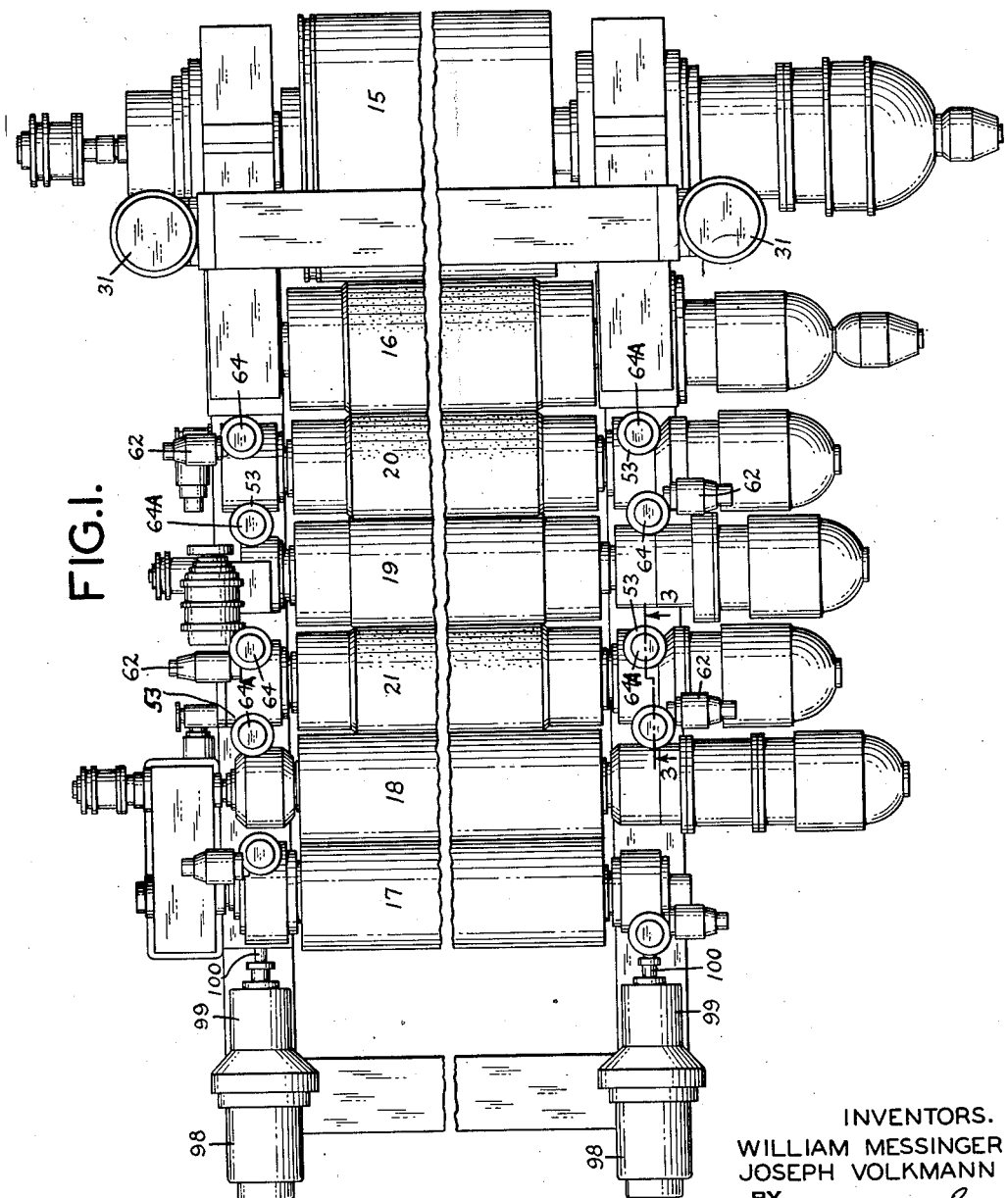
Fig. 1 is a schematic plan view of typical paper coating apparatus embodying nip adjusting mechanism constructed according to the invention.
Figure 6:
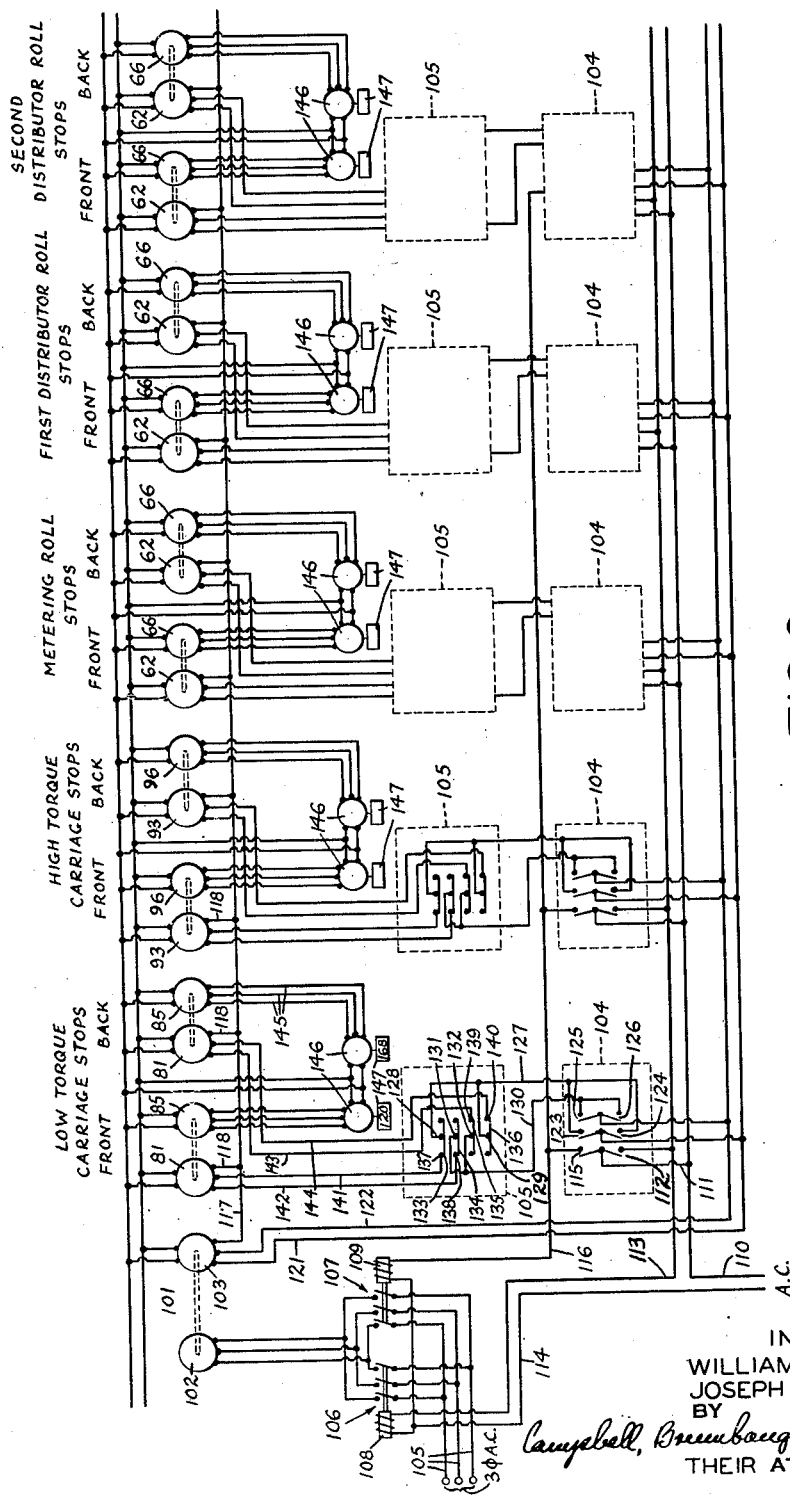

Fig. 6 is a schematic diagram of a control system according to the invention for controlling the adjustment of the stops on the upper tier of the coater apparatus of Fig. 1 from a relatively remote position; and Fig. 7 illustrates schematically an electrical control system for controlling the nip adjustments between the several rolls in the upper tier of the coater, in accordance with the invention.

For purposes of illustration, the invention will be described herein as applied to the adjustment of the nips between adjacent rolls in apparatus of the type employed for applying a coating to a paper web. In the representative embodiment shown in Fig. 2, the coater apparatus comprises a sole plate 10 which carries a lower tier of cooperating rolls for coating one side of a paper web 11, and to which pairs of upright members 12 and 13 are secured on opposite sides of the apparatus (only one of each being shown in Fig. 2). Mounted on the upright members 12 and 13 is a platform 14 which carries an upper tier of cooperating rolls for coating the other side of the paper web 11, if desired.

Mounted one above the other in the upright members 12 are upper and lower backing-up rolls 15, and upper and lower applicator rolls 16. The coating to be applied to one side of the paper web 11 is adapted to be transferred to the lower applicator roll 16 by a plurality of transfer rolls including a metering roll 17, a fountain roll 18, an oscillating roll 19, and a distributor roll 20.

Coating material for the other side of the web 11 is adapted to be transferred to the upper applicator roll 16 by a similar group of rolls designated by corresponding reference characters. However, the upper and lower backing-up rolls 15 rotate in opposite directions so that another distributor roll 21 should preferably be disposed between the upper fountain roll 18 and the upper oscillating roll 19 to insure the effective transfer of coating material to the upper applicator roll 16. The driving mechanisms for the two groups of rolls are well known in the art and it will not be necessary to describe them in detail herein.

The oscillating roll 19 constitutes a distributor roll in that it is a member of a distributor roll group. However, for purposes of distinguishing same it is sometimes herein referred to as merely an oscillating roll.

Each of the backing-up rolls 15 is mounted on a shaft 22, the opposite ends of which are journalled in suitable roller bearings 23 housed in eccentric bushings 24 which in turn are carried in suitable antifriction bearings 25.

Simultaneous rotation of the eccentric bushings 24 in either direction permits the center line of the shaft 22 to be moved either towards or away from the center line of the shaft of the applicator roll 16 which is fixedly mounted in suitable bearings carried by the upright members 12. The eccentric bushings 24 and the adjusting mechanisms therefor are identical in construction and only one need be described in detail herein.

Rotation of the eccentric bushing 24 may be accomplished by means of an arm 26 (Figs. 4 and 4A) carrying a pin 27 which extends through a bore 28 in a shaft 29. The shaft 29 is coupled to a conventional torque motor 31 secured on the upright member 12 (Fig. 2), through suitable means such as a conventional ball screw mechanism 30, for example, for converting rotation of the torque motor 31 in either direction to upward or downward movement of the shaft 29. With this construction, rotation of the motor 31 in one direction or in the opposite direction causes the eccentric bushing 23 to rotate in either the clockwise or the counterclockwise direction.

The lower end of the shaft 29 extends through a bore 32 formed in a bracket 33 mounted on one of the upright members 12, which is adapted to cooperate with adjustable stop members 34 and 35 (Fig. 4A) to limit downward and upward displacements of the shaft 29, respectively.

The stop member 35 is preferably made adjustable with respect to the shaft 29. To this end, it may comprise a transversely split ring-like member 36 (Fig. 4) mounted for sliding movement on the shaft 29, without rotation relatively thereto. The two halves of the ring-like member cooperate to form a housing for a gear 37 which is threaded on the lower end of the shaft 29. The gear 37 is adapted to engage a worm 38 on a shaft 39 to which is secured a hand wheel 40. The hand wheel 40 may be provided with suitable calibration marks 41 adapted to cooperate with an indexing member 42 to enable the stop 35 to be set to selected values. If desired, suitable shock absorber means may be provided and it may comprise, for example, plunger means 43 (Fig. 4) on the stop 35 which is adapted to enter a correspondingly shaped recess 44 in the lower end of the bracket 33 to form an air cushion.

The stop 34 is preferably also made adjustable with respect to the shaft 29 and it may be constructed in substantially the same manner as the stop 35.

In the lower tier, the distributor roll 20 and the oscillating roll 19 are mounted on a carriage 45 (Fig. 2) which is slidable on suitable ways 46 formed on a sloping girder resting on sole plate 10. The oscillating roll 19 is mounted in suitable bearings and it may be provided with suitable mechanism for producing axial movement as well as rotation of the roll, as is well known in the art. In the upper tier, the carriage 45 also carries the distributor roll 21.

The metering roll 17 and the fountain roll 18 in both tiers of the apparatus are mounted on a carriage 69 which is also slidably mounted on the ways 46 behind the carriage 45.

Each of the distributor rolls 20 and 21 is mounted on a shaft 47 journalled at its opposite ends in eccentric bushings 48 carried in suitable bearings 49, thereby providing for movement of the center line of the shaft 47 towards or away from the center line of the shaft of the oscillating roll 19. The eccentric bushings 48 are identical and only one need be described in detail. Adjustment of the eccentric bushing 48 may be accomplished by means of a worm gear mechanism which is shown in greater detail in Figs. 3 and 3A.

Figure 3:
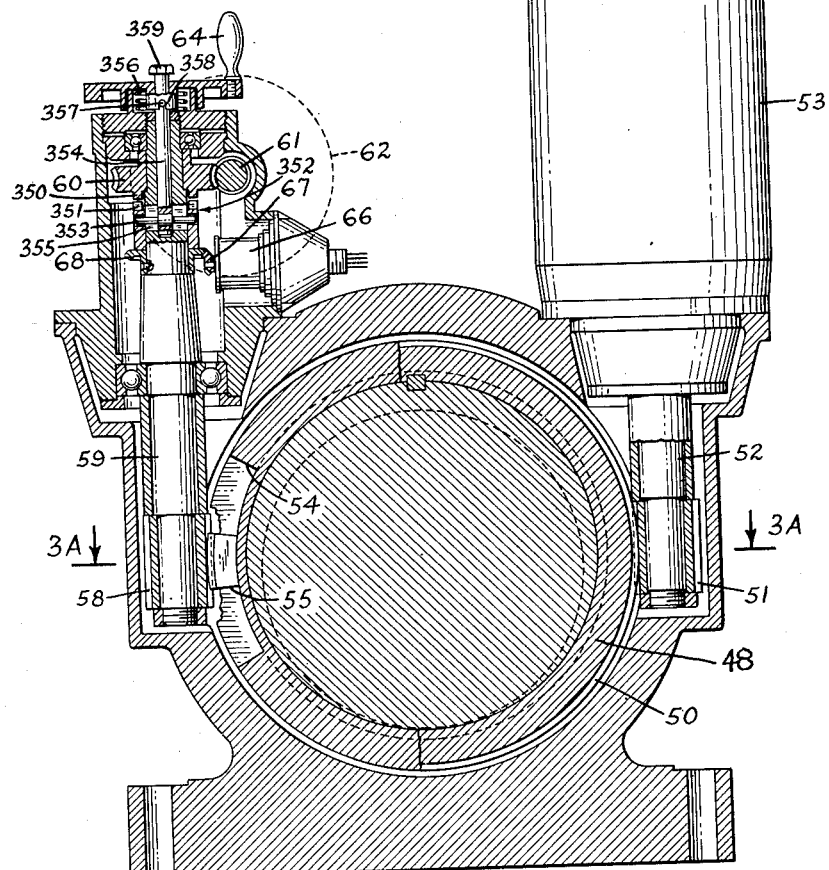
Fig. 3 is a view in transverse section taken along line 3—3 of Fig. 1 and showing the mechanism for setting the stop means and for adjusting the axis of a distributor roll with respect to an adjacent roll.

Referring to Fig. 3, the eccentric bushing 48 is provided with external teeth 50 engaged by a worm 51 on a shaft 52 which is adapted to be driven by suitable motive means such as a conventional torque motor 53, for example. In one side of the eccentric bushing 48 (Fig. 3A) is formed a recess 54 into which extends an axially extending lug 55 on a ring 56. The lug 55 on the ring 56 cooperates with the recess 54 in the eccentric bushing 48 to form a stop for the latter which limits its rotational motion in either direction. The ring 56 is mounted for relative rotation with respect to the eccentric bushing 48 and it is provided with external teeth 57 engaged by a worm 58 (Fig. 3) on a shaft 59 having a gear 60 mounted thereon for rotation without translation.

The hub of the gear 60 carries tooth and slot means 350 which is adapted to cooperate with corresponding tooth and slot means 351 on a clutch collar 352 to couple the gear 60 to the shaft 59. The clutch collar 352 is secured by a pin 353 to a rod 354 which extends coaxially within the shaft 59. The pin 353 passes through a longitudinal slot 355 in the shaft 59 which is made long enough to permit the clutch collar 352 to be moved into and out of engagement with the hub of the gear 60.

Mounted on the upper end of the rod 354 is a hand wheel 64 which is normally urged against a nut 359 by a compression spring 356. The rod 354 carries a pin 357 which normally clears the hub of the handwheel 64 but which is adapted to enter a slot 358 when the handwheel 64 is pushed downwardly to couple it to the rod 354.

Normally the spring 356 urges the handwheel 64 against the nut 359, thereby decoupling the handwheel 64 from the rod 354 and coupling the gear 60 to the shaft 59 through the clutch collar 352. Under these conditions, adjustment of the position of the stop 55 is made by the motor 62. For manual adjustment of the stop 55, the hand wheel 64 is pushed downwardly to couple it to the rod 354 and to uncouple the gear 60 from the shaft 59. A similar handwheel 64a and associated mechanism may be provided for manual adjustment of the eccentric bushing 48, if desired.

According to the invention, the position of the lug 55 is adapted to be controlled from a remote point and means is provided at the remote point for indicating its position at any instant. Such means may include, for example, a conventional self-synchronous motor or transmitter 66 (Fig. 3), the shaft of which is coupled through a pinion 67 and gear 68 to the shaft 59 so that it receives the same mechanical input as the ring 59 on which the lug 55 is mounted. The self-synchronous transmitter 66 may be electrically connected to a remotely located receiver which, in turn, may drive a suitable counter or other indicator to indicate the position of the lug 55, as described in greater detail below.

Figure 3A:
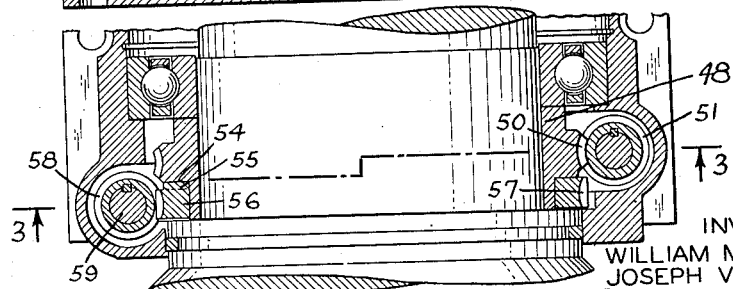
Fig. 3A is a view in longitudinal section taken along line 3A—3A of Fig. 3.

Mechanism similar to that shown in Figs. 3 and 3A may also be provided for the eccentrics at both ends of the shafts on which the metering rolls 17 in both tiers are carried.

The apparatus described above provides for adjustment of the nips between the backing-up and applicator rolls, the distributor and oscillating rolls, and the metering and fountain rolls. Adjustment of the nips between the distributor and applicator rolls in the upper and lower tiers, the fountain and oscillating rolls in the lower tier and the fountain and first distributor rolls in the upper tier is effected by movement of the carriages 45 and 69 on the ways 46 (Fig. 2), as described in greater detail hereinafter.

Figure 5B:
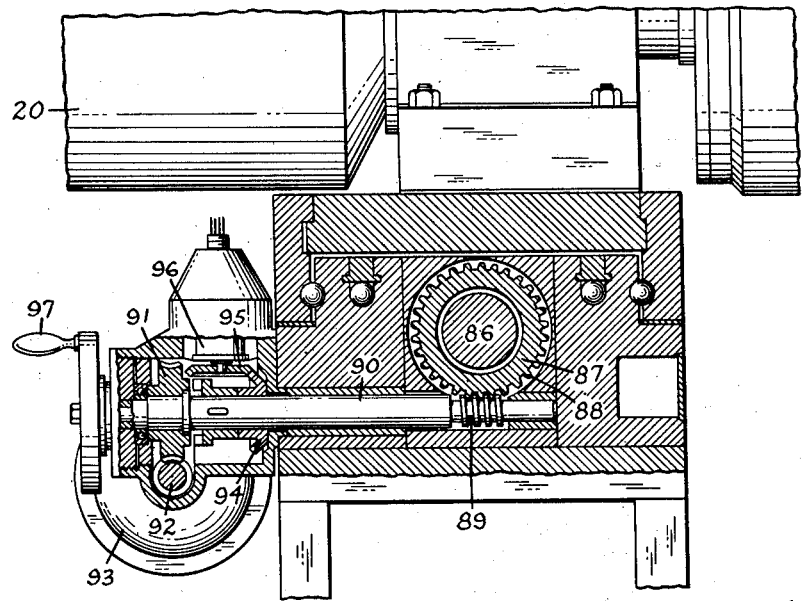
Figs. 5A and 5B are views, partially in section, taken along lines 5A—5A and 5B—5B, respectively, of Fig. 5, of mechanism for setting the fountain roll carriage stops, and the distributor roll carriage stops, respectively.
Figure 5A:
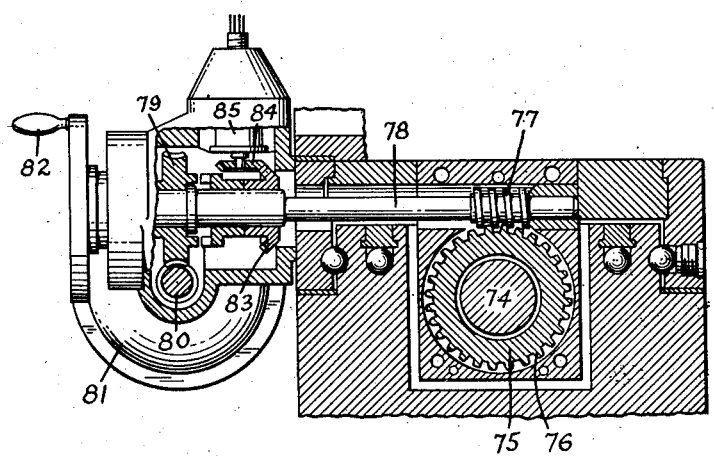

The carriage 69 is provided with spaced apart supports 69' at the opposite ends of the rolls carried thereby, one of which is shown in Fig. 5. The supports 69' are slidably mounted on correspondingly spaced apart suitable frictionless bearings 46', one of which is shown in Figs. 5, 5C and 5D. The mechanical construction of the supports 69', the bearings 46' and the associated positioning equipment at the opposite ends of the machine is the same and it will be necessary, therefore, to describe only one end of the machine.

The bearing 46' is provided with a trough 70 therein into which extends a lug 71 on the support 69'. The lug 71 is of substantially the same shape as the trough 70 but it is somewhat shorter so as to permit relative movement within limits between the support 69' and the trough 70.

In similar fashion, the carriage 45 has spaced apart supports 45' at the opposite ends of the rolls carried thereby, one being shown in Fig. 5, which are slidably mounted on the bearings 46'. Each support 45' has a lug 73 formed thereon which extends into a similarly shaped but slightly longer trough 72 formed in the bearings 46'.

The nip between the fountain roll 18 and the first distributor roll 21 is determined by adjustable stop members 74 which are mounted for axial movement without rotation at the rear of the carriage supports 45'. Since these stops 74 and the control means therefor are identical, only one need be described in detail. The stop member 74 is adapted to be advanced and retracted, as desired, by means of a nut 75 which is threaded thereon and which is provided with external teeth 76 (Fig. 5A) engaged by a worm 77. The worm 77 is carried by a shaft 78 on which is mounted a gear 79 engaging a worm 80 driven by suitable motive means such as a conventional self-synchronous motor 81, for example. A hand wheel 82 may also be provided to effect manual adjustment of the stop 74, if desired, and it may be constructed substantially in the same manner as the hand wheel 64 (Fig. 3).

The shaft 78 also carries a gear 83 engaging a gear 84 mounted on the shaft of a conventional self-synchronous transmitter 85 which may be electrically connected to a corresponding receiver adapted to actuate a suitable counter located at a remote control position, as will be described later. With this construction, the setting of the stop member 74 may be observed at the remote control position.

Similar mechanism (not described herein) may be provided for adjusting the nip between the fountain roll 18 and the oscillating roll 19 in the lower tier.

The nip between the distributor roll 20 and the applicator roll 16 is determined by adjustable stop members 86 (Fig. 5) which are mounted for longitudinal movement without rotation on the bearings 46'. The stop members 86 and their adjusting mechanisms for the opposite sides of the machine are identical and only the apparatus for one side will be described in detail. The stop member 86 is adapted to be advanced and retracted by a nut 87 threaded thereon which has external teeth 88 (Fig. 5B) engaging a worm 89 on a shaft 90. The shaft 90 carries a gear 91 engaging a worm 92 driven by suitable motive means such as a conventional torque motor 93, for example.

The shaft 90 also carries a gear 94 engaging a gear 95 on a conventional self-synchronous transmitter 96 which may be electrically connected to a corresponding receiver for actuating suitable indicator means at a remote control position, as will be described in greater detail hereinafter. A hand wheel 97 may also be provided for manually adjusting the stop member 86, and it may be like the hand wheel 64 (Fig. 3).

Corresponding stop means and adjusting mechanism therefor (not described herein) may be provided for adjusting the nip between the second distributor roll 20 and the applicator roll 16 in the lower tier.

The carriage 69 is adapted to be advanced on the ways 46 by suitable motive means such as a conventional torque motor 98 (Figs. 1 and 2), for example. The output of the motor 98 is coupled to the carriage 69 by a suitable ball screw mechanism 99 or the like which serves to convert rotation of the motor 98 in opposite directions to advancement and retraction, respectively, of a shaft 100 secured to the carriage 69.

*The stop adjustment control system*

A typical control system for controlling the motors 81 (Fig. 5A), 93 (Fig. 5B) and 62 (Fig. 3) for the upper tier of rolls is shown in Fig. 6. The several self-synchronous motors 81, 93 and 62 for both sides of the coater apparatus may be energized by a conventional motor generator set 101 comprising a conventional three phase motor 102 directly coupled to a self-synchronous transmitter (generator) 103, for example. The three phase output from the generator 103 is adapted to be applied selectively to the motors 81, 93 and 62 by a plurality of selector switches 104 which also control the phase rotation of the energy supplied to the motors and, therefore, the direction of rotation of the latter. A plurality of motor selector switches 105 are also provided which enable the front and back motors of any pair to be operated simultaneously or individually, as desired.

The motor 102 is adapted to be energized from a suitable source of three phase alternating current through the conductors 105 and the switch contacts 106 or 107, respectively, on a pair of relays 108 and 109. Energization of the relay 108 closes the contacts 106 and applies three phase A. C. of one rotational sequence to the motor 102, thereby causing it to rotate in one direction. Energization of the relay 109 closes the contacts 107, supplying electrical energy of reversed phase sequence to the motor 102 and causing it to rotate in the opposite direction.

The relay 108 is adapted to be energized from a suitable source of single phase A. C. through the conductors 110 and 111, the contacts 112 on the selector switch 104 and the conductors 113 and 114. In similar fashion, the relay 109 is adapted to be energized from the single phase A. C. source through the conductors 110 and 111, the contacts 115 on the selector switch 104 and the conductors 116 and 114.

One output terminal of the self-synchronous transmitter (generator) 103 is connected to a conductor 117 which is connected by the conductors 118 to one terminal of each of the motors 81, 93 and 62.

The other two terminals of the self-synchronous transmitter 103 are connected by the conductors 121 and 122 to the common terminals of the contacts 123, 124 and 125, 126, respectively, of the several selector switches 104. The end terminals of the switch contacts 123 and 124 are connected by a conductor 127 to the contacts 128 and 129 on the motor selector switch 105. Similarly, the end terminals of the selector switch contacts 125 and 126 are connected by a conductor 130 to the fixed contacts 131 and 132 of the motor selector switch 105.

The motor selector switch contacts 128, 131, 132 and 129 are adapted to be engaged by the switch blades 133, 134, 135 and 136, respectively, which complete connections to the fixed contacts 137, 138, 139 and 140. The switch contacts 137 and 138 are connected by the conductors 141 and 142 to the other two terminals of the front self-synchronous motor 81 while the terminals 139 and 140 are connected by the conductors 143 and 144 to the other two terminals of the back self-synchronous motor 81.

The motor selector switch 105 may be of the type which is normally maintained in a middle position by spring means or the like (not shown). In this position, the switch blades 133, 134, 135 and 136 are in engagement with their respective contacts to cause both the front and back motors 81 to be operated in synchronism. By moving the switch to one side or to the opposite side against the spring means, the switch blades 133, 134, or 135, 136 may be disengaged from their respective contacts to deenergize either the front or the back motor 81, thereby permitting the other motor 81 to operate alone.

As indicated above, the self-synchronous transmitters 85 are connected by the conductors 145 to corresponding self-synchronous receivers 146 which drive suitable counter mechanisms 147 located at a remote control position such as on a switchboard, for example.

Similar selector switches 104, motor selector switches 105, and control circuits are provided for the motors 93 and 62 and corresponding parts have been designated by corresponding reference characters. Also, a similar control system (not shown) may be provided for the lower tier.

With the construction described above, it will be understood that the several nip adjustment stops in the coater apparatus can be adjusted individually by selectively manipulating the appropriate group of selector switches 104 and motor selector switches 105.

*The nip adjustment control system*

At the start of any coater operation, the surfaces of the respective rolls may be dry and, since the transfer rolls rotate at different speeds, damage may result if the nips are closed under these conditions. In order to avoid this, the rolls must be closed in proper sequence beginning at the metering roll 17 (Fig. 2) in such fashion as to insure that no two adjacent rolls are brought into engagement until a lubricating film of coating material has been applied to one of the rolls. A typical control system for adjusting the nips between the rolls in the upper tier is shown in Fig. 7. Since the metering and fountain rolls do not operate in contact and are lubricated by coating material at all times, the nips between them may be adjusted by manually operated synchronous motors and not by the automatic sequence control system to be described.

In Fig. 7, the carriage motors 98 are adapted to receive electrical energy from a suitable source of three phase A. C. through the conductors 148, the relay contacts 150 and the conductors 149 for one direction of rotation, and through the conductors 148, the relay contacts 151, and the conductors 149 for the reverse direction of rotation.

The first distributor roll motors 53A likewise are adapted to receive three phase A. C. from the conductors 148, through the relay contacts 153 and the conductors 152 for one direction of rotation, and through the relay contacts 154 and the conductors 152 for the other direction of rotation. A. C. for operation of the second distributor roll motors 53 (Fig. 2) is supplied from the conductors 148 through either of the relay contacts 155 or 156 depending upon the direction of rotation desired and through the conductors 157.

Similarly, electrical energy for the backing-up cylinder motors 31 is supplied from the conductors 148 through either the relay contacts 158 or 159, depending upon the direction of rotation desired, and the conductors 160.

Connected in the rotor circuits of the carriage torque motors 98 are a plurality of resistors 161. The values chosen for the resistors 161 are such that when the motors 98 are initially energized with normal voltage, the torque developed is just enough to advance the carriage 69 (Fig. 5) into engagement with the stops 74, at which point the motors stall. When, subsequently in the operating cycle, it is desired to increase the torque sufficiently to raise both the carriages 69 and 45, a portion of each of the resistances 161 (Fig. 7) is shorted out for this purpose. To this end, taps 161' on the resistances 161 may be connected by the conductors 162 to the switch contacts 163 which are normally open but which are adapted to be closed when the motor torque is to be increased.

Also, an adjustable speed motor 164 for the oscillating roll 19 (Fig. 2) receives electrical energy from the conductors 148 through a conventional regulator 165 and through the switch contacts 166.

The relay contacts 150, 151, 153, 154, 155, 156, 163, 158, 159 and 166 are all normally open but are adapted to be closed by corresponding relays 167, 168, 169, 170, 171, 172, 173, 174, 175 and 176 which may be operated individually when corresponding push buttons 178, 179, 180, 181, 182, 183, 184, 185, 186 and 187, respectively, are manipulated, an automatic-manual switch 188 being then in the manual position. The switch 188 is preferably spring loaded so that it remains in the automatic position unless held against the spring force for manual operation.

With the automatic-manual switch 188 in the automatic position, and the start buttons 186 and 178 depressed, the relays 168, 170, 172, 173, 175 and 176 are adapted to be actuated automatically in a predetermined sequence, as described in greater detail below. Energization of these relays in the proper sequence is controlled by a plurality of stationary interlock switches 303, 189, 190, 191 and 192 which are adapted to be closed by a plurality of adjustable actuators 303', 189', 190', 191', and 192', respectively, just prior to the times when the several nips between the rolls in the upper tier of the coating apparatus are closed.

The interlock switch 192 is mounted on the upright member 12 and is adapted to be closed by the actuator member 192' on the eccentric bushing 24 just prior to the closing of the nip between the backing-up cylinder 15 and the applicator roll 16 (Fig. 2); the switch 303 (Fig. 5) mounted on the ways 46 is adapted to be closed by the actuator 303' on the carriage 69 just prior to the closing of the nip between the fountain roll 18 and the first distributor roll 21; the switch 189 carried by the bearing 49 (Fig. 2) for the distributor roll 21 is adapted to be closed by the actuator 189' on the eccentric bearing 48 just prior to the closing of the nip between the first distributor roll 21 and the oscillating roll 19; the switch 190 mounted on the bearing 49 (Fig. 2) for the distributor roll 20 is adapted to be closed by the actuator 190' on the eccentric bearing 48 just prior to the closing of the nip between the second distributor roll 20 and the oscillating roll 19; and the switch 191 on the ways 46 (Fig. 5) is adapted to be closed by the actuator 191' on the carriage 45 just prior to the closing of the nip between the second distributor roll 20 and the applicator roll 16.

In order to insure the presence of a lubricating film of coating material on a roll before that roll is brought into engagement with an adjacent roll in closing the nip, a plurality of time delay relays 193, 194 and 195 are provided. The relay 193 delays the closing of the nip between the first distributor roll 21 and the oscillating roll 19 after the interlock switch 303 has closed, until a film of coating material has been applied to the first distributor roll 21 at least up to the point where it will engage the oscillating roll 19 when the nip is closed.

Similarly, the time delay relay 194 introduces a time delay after the closing of the interlock switch 189 which is sufficient to insure the presence of a lubricating film of coating material on the oscillating roll 19 before the nip between the latter and the second distributor roll 20 is closed.

In like manner, the relay 195 delays the closing of the nip between the second distributor roll 20 and the applicator roll 16 after closing of the interlock switch 190 to permit the application of coating material on the distributor roll 20 at least up to the point where it will engage the applicator roll 16 when the nip is closed.

A heat protection relay 196 is also provided which serves to deenergize the first and second distributor roll motors 53A and 53 after the elapse of sufficient time to permit completion of all the necessary nip adjustments. This prevents overheating of the motors 53A and 53 which are designed to stall when they have reached their limiting positions corresponding to the proper nip adjustments. It will be observed that the nips between the first and second distributor rolls and the oscillating roll do not change when the motors 53 and 53A are deenergized because the worms 51 (Fig. 3) and cooperating gears 50 act as locks. If desired, either one or both of the motors 53A or one or both of the motors 53 can be deenergized by the relay 196.

In case it is desired to change the stop settings for the first and second distributor rolls 21 and 20 after the nips have been closed, partial release relays 197 and 197A are provided which serve to release the pressure against the stops sufficiently to permit the stop adjusting motors to be operated. The relays 197 and 197A are adapted to be actuated by the start buttons 198 and 198A, respectively, and they may be restored by corresponding start buttons 199 and 199A, respectively.

A heat protection relay 201 may also be provided to disconnect the first and second distributor roll motors 53A and 53 from the power mains after the eccentric bearings in which the distributor rolls 21 and 20 are mounted have reached their limiting open positions, so as to prevent overheating of the motors 53A and 53 which are designed to stall when that occurs.

A switch 202 is provided which may be operated by a relay 203 to reverse automatically all of the torque motors and thereby open the several nips between the rolls. Normally, the switch 202 is in the position shown which results in the operation of the system to close the several nips between the rolls.

The reversing relay 203 receives power from the mains through the conductors 204 and it is designed to throw the switch 202 to the reverse position if a voltage failure occurs. It may also be operated to open the nips between the rolls in the upper tier, when only the lower tier is to be used in a coating operation, by manipulating a switch 205. A similar switch 505 in series with a conductor 506 connected to the lower conductor 204 between the switches 205 and 205A may be provided for opening the nips in the lower tier when only the upper tier is to be used for coating a web. The nips in both tiers may be opened by opening either of the switches 205A or 205B. With this construction, the web may be coated on either side only or on both sides, as desired.

*Stop adjustment*

The stops 34 and 35 (Figs. 4 and 4A) controlling the nips between the backing-up cylinder 15 and the applicator roll 16 (Fig. 2) in the upper tier may be adjusted manually by means of the hand wheels 40. The stops 55 (Figs. 3 and 3A) controlling the nips between the first and second distributor rolls 21 and 20, respectively, and the oscillating roll 19 and between the metering roll 17 and the fountain roll 18; the stops 74 (Fig. 5) controlling the nip between the fountain roll 18 and the first distributor roll 21; and the stops 86 controlling the nip between the second distributor roll 20 and the applicator roll 16 may be adjusted by proper manipulation of the appropriate group selector switches 104 (Fig. 6), the settings being observed on the counters 147.

The stops controlling the nips between the rolls in the lower tier may be adjusted in the same manner by another control system (not shown) like that shown in Fig. 6. Since there is no distributor roll between the fountain roll 18 and the oscillating roll 19 in the lower tier, the portion of the control system of Fig. 6 for adjusting the nip between the first distributor roll 21 and the oscillating roll 19 would be omitted from the lower tier control system.

Operation

In a typical automatic nip closing operation for the upper tier of rolls, the switch 202 (Fig. 7) is set in the nip closing position and the automatic-manual switch 188 is set for automatic operation. The start push button 186 is then actuated. This energizes the backing-up cylinder closing relay 175 through a circuit which is traced from the mains terminal 208, through the conductor 209, the fixed contacts 210 engaging switch blade 211 on the reversing switch 202, the conductor 212, the normally closed stop button 207, the closed start button 186, the relay 175, and the conductor 213 to the mains terminal 214. Energization of the relay 175 closes the contacts 159 and energizes the backing-up cylinder motors 31 in the direction to close the nip between the backing-up cylinder 15 and the applicator roll 16. Simultaneously, the relay holding contacts 215 are closed so as to short out the start button 186. This maintains the relay 175 energized after the start button 186 has been released.

When the nip between the backing up cylinder 15 (Fig. 2) and the applicator roll 16 is almost closed, the interlock switch 192 is closed, thereby connecting one terminal of the start button 179 to the mains terminal 208 through a circuit including the conductor 216 and a normally closed stop button 217. The start button 179 is then depressed to connect one terminal of the carriage torque motor closing relay 168 to the mains terminal 208, its other terminal being connected to the mains terminal 214 through the conductor 213.

Figure 2:
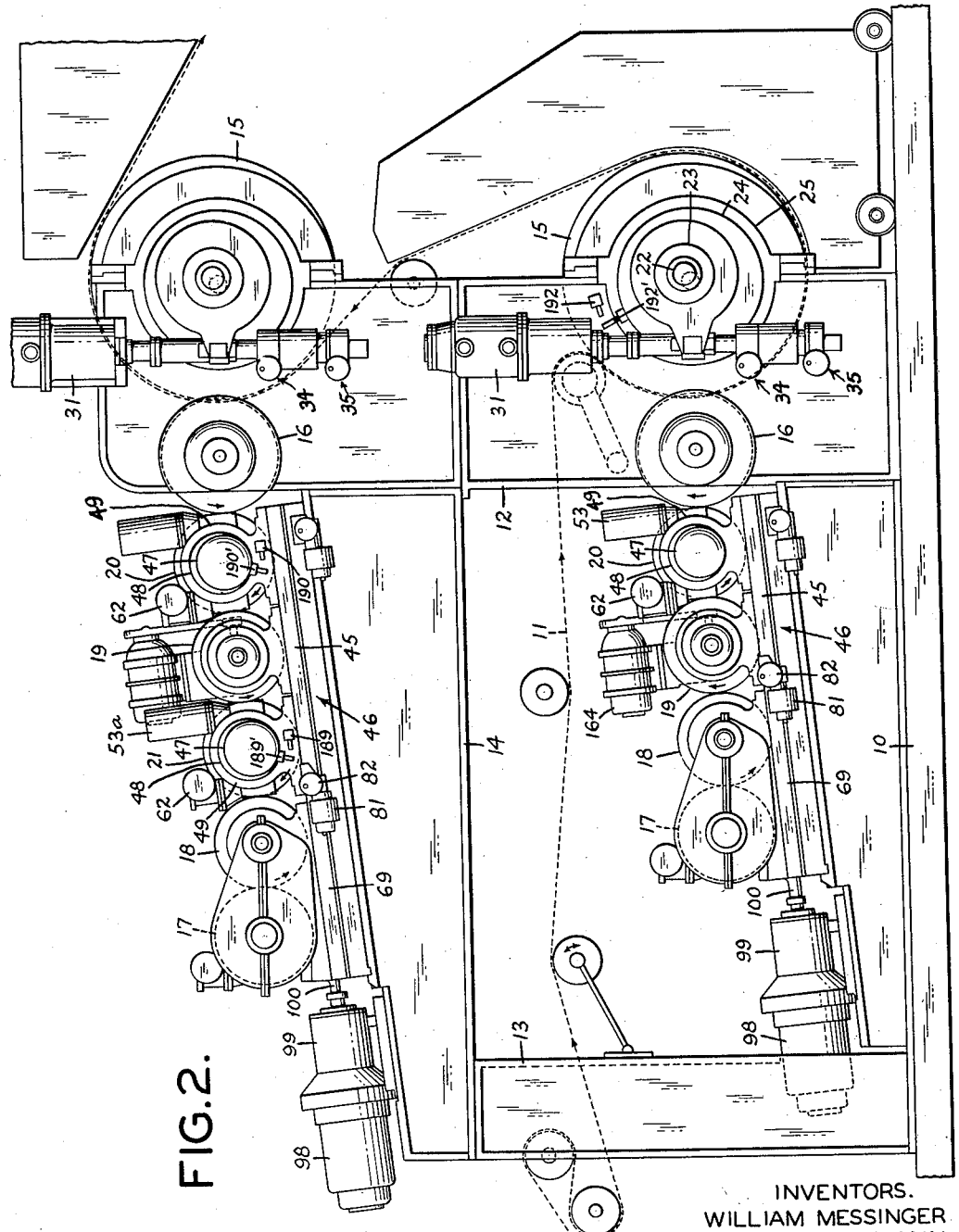
Fig. 2 is a side view in elevation of the apparatus shown in Fig. 1.

Energization of the relay 168 closes its contacts 151 and a holding contact 218 which shorts out the start button 179 and maintains the relay 168 energized after the start button 179 has been released. The closing of the contacts 151 energizes the front and back torque motors 98 in the proper direction to close the nip between the fountain roll 18 and the first distributor roll 21 (Fig. 2). However, since the switches 163 (Fig. 7) are open, all of the resistance of the resistors 161 is connected in the rotor circuits of the motors 98 so that the latter exert only sufficient torque to move the carriage 69 (Fig. 5) into engagement with the stops 74.

When the nip between the fountain roll 18 and the first distributor roll 21 (Feg. 2) is almost closed, the interlock switch 303 (Fig. 7) closes and connects one terminal of the heat protective relay 196 to the supply mains terminal 208, the other terminal of the relay 196 being connected to the supply mains terminal 214 through the conductors 219 and 213. The contacts 220, 221 and 222 of the heat protective relay 196 are normally closed and they remain closed until a predetermined time corresponding to the time required for execution of a complete sequence of nip closing operations, say 30 seconds, has elapsed.

The closing of the interlock switch 303 also connects the supply mains terminal 208 to one terminal of the time delay relay 193 through a circuit including the closed contacts 222 of the relay 196 and a conductor 223. The other terminal of the time delay relay 193 is connected to the other supply mains terminal 214 through the conductors 224A and 213 so that the delay is now energized. However, it is designed so that its contacts 225 do not close immediately, but remain open until sufficient time has elapsed for a lubricating film of coating material to reach the portion of the first distributor roll 21 which will engage the oscillating roll 19 when the nip is closed. After the predetermined time has elapsed, the contacts 225 are closed.

The closing of the contacts 225 of the time delay relay 193 connects one side of the first distributor roll nip closing relay 170 to the supply mains terminal 208, through a circuit including the closed contacts 225 of the relay 193, the conductor 226, and the fixed contacts 227 engaging the switch blade 228 of the manual-automatic switch 188. Since the other terminal of the relay 170 is connected to the other supply mains terminal 214 through the conductor 213, the relay 170 is now energized and its contacts 154 are closed. This causes the roll adjusting motors 53A for the first distributor roll 21 to move the roll 21 in the direction to close the nip between the latter and the oscillating roll 19.

When the nip between these two rolls is just about closed, the interlock switch 189 is automatically closed and it connects one terminal of the time delay relay 194 to the supply mains terminal 208 through a circuit including the closed contacts 221 of the heat protective relay 196, a conductor 229 and the closed interlock switch 189. Since the other terminal of the relay 194 is connected to the other supply mains terminal 214 through the conductors 230 and 213, the relay 194 is now energized. However, its contacts 231 are not closed immediately but remain open until sufficient time has elapsed to insure the presence of a lubricating film of coating material on that portion of the oscillating roll 19 which is to engage the second distributor roll 20 when the nip is closed.

After the predetermined time delay has elapsed, the contacts 231 close and connect one terminal of the second distributor roll closing relay 172 to the supply mains terminal 208 through a circuit including the closed relay contacts 231, the conductor 232, and the fixed contacts 233 engaging the switch blade 234 on the manual-automatic switch 188. Since the other terminal of the relay 172 is connected to the other supply mains terminal 214 through the conductor 213, the relay 172 is now energized and closes its contacts 156. This energizes the second distributor roll motors 53 in the direction to close the nip between the second distributor roll 20 and the oscillating roll 19.

When the nip between the second distributor roll 20 and the oscillating roll 19 is about closed, the interlock switch 190 closes. This connects one terminal of the time delay relay 195 to the supply mains terminal 208 through a circuit including a conductor 233, the closed interlock switch 190, the conductor 216, the closed interlock switch 192, the closed locking contacts 215 on the switch 159, the closed stop button 207, the conductor 212, the fixed contacts 210 engaging the switch blade 211 of the reversing switch 202 and the conductor 209.

Since the other terminal of the time delay relay 195 is connected to the other supply mains terminal 214 by the conductor 213, the relay 195 is now energized. However, its contacts 234 are not closed until sufficient time has elapsed for a lubricating film of coating material to have reached the portion of the second distributor roll 20 which will engage the applicator roll 16 when the nip is closed. At the end of the specified time delay, the contacts 234 close and connect the carriage high torque closing relay 173 to the supply mains terminal 208 through a circuit including the closed contacts 234, a conductor 235 and the fixed contacts 236 engaging the switch blade 237 of the manual-automatic switch 188.

The other terminal of the relay 173 is permanently connected to the supply mains terminal 214 by the conductor 213 so that the relay 173 is now energized and closes its contacts 163. This short-circuits a portion of the resistance in each of the resistors 161 in the rotor circuits of the motors 98. As a result, the torque exerted by the motors 98 is now increased sufficiently to cause the carriages 69 and 45 (Fig. 2) to move upwardly on the ways 46 in the direction to close the nip between the second distributor roll 20 and the applicator roll 16.

Meanwhile, the closing of the interlock switch 190 has also connected one terminal of the oscillating roll closing relay 176 to the supply mains terminal 208, through the conductors 238 and the fixed contacts 239 engaging the switch blade 240 of the manual-automatic switch 188. The other terminal of the relay 176 is connected to the supply mains terminal 214 by the conductor 213 so that the relay 176 is now energized, and the contacts 166 are closed to energize the oscillator motor 164 for the oscillating roll 19.

When the nip between the second distributor roll 20 and the applicator roll 16 is about closed, the interlock switch 191 closes and connects an indicator lamp 241 to the supply mains terminals 208 and 214 through the conductors 209, 242, 243 and 213. When this occurs, all of the nips between the several rolls will have been properly adjusted and the motors 98, 53, 53A and 31 will be stalled and at rest.

A short time after the cycle described above has been completed, the heat protective relay 196 opens its contacts 221 and 222 and deenergizes the time delay relays 193 and 194. This deenergizes the closing relays 179 and 172 and shuts off the power to the first and second distributor roll motors 53A and 53. However, since the eccentric bearings in which the first and second distributor rolls are journalled are driven by worm gears which are self-locking, the nips between the first and second distributor rolls and the oscillating roll do not open up but remain closed.

The torque motors 98 and 31 may remain energized and they may be designed for continuous operation so that excessive overheating does not take place.

If a power failure occurs, for example, in the three phase power means 148 only, a relay as at 205C connected to such power mains is deenergized and opens the switch contacts 205A or 205B (Fig. 7), thereby deenergizing the reversing relay 203 and throwing the reversing switch 202 to the reverse position it being assumed that there is no power failure across the two A. C. power mains 208, 214 or the two A. C. power mains 204, 204. In this position, the switch blade 211 no longer engages the fixed contacts 210 so that all of the closing relays are immediately deenergized. Further, the other three blades 244, 245 and 246 of the reversing switch 202 now engage other switch contacts which complete circuits to the nip opening relays controlling the several torque motors.

Thus, the switch blade 244 engages the fixed contacts 247, thereby connecting the supply mains terminal 208 to one side of the nip opening relay 174 through the conductors 209 and 248. Since the other side of the relay 174 is connected to the supply mains terminal 214 by the conductor 213, this relay is now energized and its contacts 158 close. This impresses A. C. of opposite phase rotation upon the backing-up roll motors 31, causing them to rotate in the direction to open up the nip between the backing-up roll 15 and the applicator roll 16.

The switch blade 245 on the reversing switch 202 engages the fixed contacts 249 thereby connecting the supply mains terminal 208 to one side of the nip opening relay 167 through the conductors 209 and 250, the other terminal of the relay 167 being connected to the supply mains terminal 214 through the conductor 213. The relay 167 is thus energized and its contacts 150 close, to apply A. C. of opposite phase rotation to the torque motors 98. The motors 98 now rotate in the direction to open the nips between the second distributor roll 20 and the applicator roll 16 and between the fountain roll 18 and the first distributor roll 21.

Similarly, the switch blade 246 on the reversing switch 202 engages the contacts 300 and connects the supply mains terminal 208 by the conductors 209 and 251 to one terminal of the nip opening heat protective relay 201, the other terminal of which is connected by the conductors 301 and 213 to the mains terminal 214. This relay has normally closed contacts 252 and 253 which are adapted to open after a predetermined time sufficient for execution of a complete reversing cycle, say 30 seconds, has elapsed. The closed contacts 252 complete a circuit from the conductor 251 through the conductor 254 and the fixed contacts 255 engaging the switch blade 256 on the manual-automatic switch 188 to one side of the nip opening relay 169, the other side of which is connected by the conductor 213 to the other supply mains terminal 214. This energizes the relay 169 and closes its contacts 153 to apply A. C. of opposite phase sequence to the motors 53A for the first distributor roll 21. This causes the motors 53A to rotate in the opposite direction so as to open the nip between the first distributor roll 21 and the oscillating roll 19.

The closed contacts 253 on the heat protective relay 201 complete a circuit from the conductor 251 through the conductor 200, and the contacts 257 engaging switch blade 258 on the reversing switch 188 to one terminal of the second distributor roll opening relay 171. The relay 171 is now energized and its contacts 155 are closed to apply A. C. of opposite phase sequence to the motors 53 so that the latter now rotate in the direction to open the nip between the second distributor roll 20 and the oscillating roll 19.

A short time after the nip opening sequence has been completed, as described above, the contacts 252 and 253 on the heat protective relay 201 open and deenergize the relays 169 and 171, thus shutting off power to the motors 53A and 53.

The above nip opening sequence may also be initiated for either one of the upper and lower tiers of rolls by manual operation of the sampling switches 205 and 505, respectively, and for both sections simultaneously by opening either the manual switch 205A or the emergency switch 205B. It may also be initiated by paper break responsive means of the usual type, the details of which are well known in the art. In such case the paper break responsive means might be connected to open one of the switches 205A or 205B. For example, the web 11 may pass between the photoelectric cell 205D and a lamp 205E. A break in the web will be sensed by the cell 205D which is operatively connected to the switch 205B for opening the latter in the event of such break thereby to separate the rolls.

In some cases, it may be necessary or desirable to adjust certain of the nip settings after the nip adjusting sequence described above has been completed. Since it may be difficult or perhaps impossible to move the stops 55 (Fig. 3A) against the locked worms or screws, the partial release relays 197 and 197A (Fig. 7) are provided to release the pressure against the stops sufficiently to enable the stop motors 62 (Figs. 3 and 3A) to be operated.

Operation of the release relay 197 may be initiated by depressing the start button 198 (Fig. 7). This connects one terminal of the relay 197 to the supply mains terminal 203 through a circuit which includes a conductor 260, the closed push button 198, a conductor 261, the closed interlock switch 303, the closed locking contacts 218 on the switch 151, the conductor 216, the closed stop button 217, the closed interlock switch 192, the closed locking contacts 215 on the switch 159, the closed stop button 207, the conductor 212, the fixed contacts 210 engaging switch blade 211 on the reversing switch 202, and the conductor 209. Since the other terminal of the relay 197 is connected to the other supply mains terminal 214 by the conductors 262 and 213, the relay 197 is now energized. The energization of the relay 197 closes its contacts 302 which connect the conductor 260 by the conductors 263 and 254 and the fixed contacts 255 engaging switch blade 256 on the manual-automatic switch 188 to one side of the nip opening relay 169, the other side of which is connected by the conductor 213 to the supply mains terminal 214. This energizes the relay 169, closing its contacts 153 and applying A. C. of opposite phase sequence to the motors 53 to cause them to rotate in the opposite direction.

The relay 197 is so adjusted that its contacts 302 open before the motors 53A have rotated a sufficient amount to open the nip between the first distributor roll 21 and the oscillating roll 19. It serves to supply electrical energy of the proper phase relationship to the motors 53A only long enough to release the pressure against the stops 55 (Fig. 3A).

After the stops 55 (Fig. 3A) have been adjusted, the nip restoring switch 199 is depressed, thereby connecting the conductor 261 to the conductor 226 and energizing the nip closing relay 170. This closes the contacts 154 and applies A. C. of proper phase sequence to the motors 53A to move the first distributor roll 21 in the proper direction to close the nip between it and the oscillating roll 19 to the new nip setting.

The nip release relay 197A may be operated in exactly the same manner by the push buttons 198A and 199A to change the nip setting between the second distributor roll 20 and the oscillating roll 19.

Similar control mechanism (not shown) may be provided for releasing the other nips in the apparatus to enable the stop means therefor to be adjusted after the nips have been partly or fully closed, as will be apparent to those skilled in the art.

If desired, for test or experimental purposes, the nip adjusting motors 53A, 53, and 31 and the oscillator motor 164 may be operated manually by depressing the push buttons 180, 181, 182, 183, 185, 186, and 187, the manual-automatic switch 188 first being thrown to the manual position. In the latter position, the switch blade 320 is in engagement with the contacts 321, so that one terminal of each of the push buttons is connected by the conductor 209 to the mains terminal 208.

It will be understood that an electrical control system (not shown) like that of Fig. 7, may be provided for opening and closing the nips in the lower tier of rolls (Fig. 2) in the coater apparatus.

From the foregoing, it will be understood that the invention provides a novel and highly effective control system for initially setting stop means which determine the nips between adjacent rolls in apparatus such as a paper coater, for example. Further, it provides means for automatically closing the nips between the several rolls in the apparatus in a predetermined sequence with a high degree of accuracy and reliability. By virtue of the novel construction disclosed herein, the nips may be adjusted after they have been closed, and the nips may be opened automatically when a power or other failure occurs. Individual operation of the several motors in the apparatus is also provided for.

The specific embodiment described above and illustrated in the drawings is intended to be merely illustrative and is susceptible of considerable modification in form and detail within the spirit of the invention. That embodiment, therefore, is not to be construed as restricting in any way the scope of the following claims.

We claim:

1. In combination, a movable member, adjustable stop means limiting movement of the movable member in at least one direction, electric motive means adapted for forward or reverse rotation for adjusting the position of the stop means, a source of electrical energy, relatively remote switching means controlling the application of electrical energy from the source to the motive means, thereby to control the direction of rotation of the latter, and relatively remote indicating means responsive to the adjustment of the stop means.

2. A combination as defined in claim 1, in which the motive means comprises an alternating current motor, the source of electrical energy is a self-synchronous transmitter generator driven by a polyphase alternating current motor, and the switching means controls the phase sequence of the alternating current electrical energy supplied to the generator driving motor, thereby to control the direction of rotation of the motive means.

3. A combination as defined in claim 1 in which the movable member comprises movable eccentric bearing means for a roll, the adjustable stop means limits the extent of movement of the bearing means in at least one direction, the motive means is a self-synchronous follower motor, the source of electrical energy is a self-synchronous transmitter generator driven by a polyphase alternating current motor and connected to energize the motive means, and the switching means controls the phase sequence of the alternating current electrical energy supplied to the generator driving motor, thereby to control the direction of rotation of the motive means.

4. A combination as defined in claim 1 in which a plurality of movable members are provided comprising spaced apart, movable, eccentric, bearing means for the shaft of a roll, a plurality of adjustable stop means are provided for limiting the extent of movement in at least one direction of the respective eccentric bearing means, a plurality of electric motive means are provided for adjusting the respective stop means, the switching means connects either one or all of the motive means selectively to the electrical energy source, and a plurality of relatively remote indicating means are responsive, respectively, to the adjustments of the stop means.

5. A combination as defined in claim 1 in which a plurality of movable members are provided comprising spaced apart, movable, eccentric bearing means for the shaft of a roll, a plurality of adjustable stop means are provided for limiting the extent of movement of the respective eccentric bearing means in at least one direction, a plurality of alternating current electric motive means are provided for adjusting the respective stop means, the source of electrical energy is a self-synchronous transmitter generator driven by a polyphase alternating current motor, first switching means is provided for connecting the transmitter generator to energize either one or both of the motive means, selectively, second switching means is provided for controlling the phase sequence of the alternating current energy supplied to the generator driving motor, thereby to control the direction of rotation of the selected motive means, and a plurality of relatively remote indicating means are responsive, respectively, to the adjustments of the stop means.

6. A combination as defined in claim 1 in which the movable member comprises a carriage movable on ways, the stop means limits the extent of movement of the carriage in at least one direction, alternating current electric motive means is provided for adjusting the stop means, the source of electrical energy is a self-synchronous transmitter generator driven by a polyphase alternating current motor, and the switching means controls the phase sequence of the alternating current supplied to the generator driving motor, thereby to control the direction of rotation of the motive means.

7. A combination as defined in claim 1 in which a plurality of movable members are provided and comprise spaced apart carriages movable on ways and supporting at least one roll thereon, a plurality of adjustable stop means are provided for limiting the extent of movement of the respective carriages in one direction, a plurality of electric motive means are provided for adjusting the respective stop means, the switching means is adapted to connect any one or all of the motive means selectively to the electrical energy source, and a plurality of relatively remote indicating means are responsive, respectively, to the adjustments of the stop means.

8. A combination as defined in claim 1 in which a plurality of movable members are provided and comprise spaced apart carriages movable on ways and supporting at least one roll thereon, a plurality of adjustable stop means are provided for limiting the extent of movement of the respective carriages, a plurality of alternating current electric motive means are provided for adjusting the respective stop means, the source of electrical energy is a self-synchronous transmitter generator driven by a polyphase alternating current motor, first relatively remote switching means are provided for connecting only one or all of the electric motive means selectively to the transmitter generator, second relatively remote switching means are provided for controlling the phase sequence of the alternating current supplied to the generator driving motor, and a plurality of relatively remote indicating means are responsive, respectively, to the adjustments of the stop means.

9. In combination, a movable member, adjustable stop means limiting movement of such member in at least one direction, electric motor means for adjusting the position of the stop means, electric motive means for moving the member, means for initiating preparation of a circuit to energize the motive means, and time delay means rendered operative upon actuation of the initiating means for completing the energizing circuit after a predetermined interval of time has elapsed.

10. A combination as defined in claim 9 in which second time delay means is provided for disabling the circuit completing means a predetermined longer time interval after actuation of the initiating means.

11. A combination as defined in claim 9 in which a second movable member is provided, the initiating means being responsive to movement of the second movable member to a predetermined position.

12. In combination, a first movable member, a second member movable into engagement with the first member to move the same, electrical motive means, the latter when energized moving the second member into engagement with the first and then stalling, electrical means for modifying the motive means to increase the force applied thereby to the second member, means responsive to movement of the second movable member to a predetermined position for initiating preparation of a circuit to actuate the electrical modifying means, and means rendered operative after actuation of the initiating means for completing the circuit to energize the electrical modifying means.

13. In coater apparatus or the like, the combination of a roll mounted at its opposite ends in a pair of rotatable eccentric bearings, a pair of electric motive means for rotating the respective eccentric bearings, electrical means for initiating preparation of a circuit to energize both of the electric motive means, and time delay means rendered operative upon actuation of the initiating means for completing the circuit to energize both of the electric motive means.

14. Coater apparatus or the like as defined in claim 13 in which a movable member is provided, and the initiating means is responsive to movement of the movable member to a predetermined position.

15. Coater apparatus or the like as defined in claim 13 in which a pair of stop means is provided for limiting rotational movement of the respective eccentric bearings in at least one direction, and second time delay means is provided which is rendered operative a predetermined greater time after actuation of the initiating means for disabling the circuit to energize the electric motive means.

16. Coater apparatus or the like as defined in claim 13 in which a movable member is provided, a pair of stop means is provided for limiting rotational movement of the respective bearings in at least one direction, the initiating means is responsive to movement of the movable member to a predetermined position, and second time delay means is provided which is rendered operative a predetermined greater time after actuation of the initiating means for disabling the circuit to energize at least one of the electric motive means.

17. In coater apparatus or the like, the combination of first roll means mounted at its opposite ends in a pair of rotatable eccentric bearings, a first pair of electric motive means for rotating the respective eccentric bearings, second roll means mounted at its opposite ends on carriage means slidable on inclined ways, stop means for limiting movement of the carriage means in one direction, a pair of torque motor means for advancing the carriage means into engagement with the stop means, means responsive to rotation of the eccentric bearings to predetermined positions for initiating preparation of a circuit to energize both of the torque motor means, and means for completing the circuit to energize the torque motor means.

18. Coater apparatus or the like as defined in claim 17 including third roll means mounted at the opposite ends thereof in rotatable eccentric bearings carried by second carriage means slidable on the ways and adapted to be engaged by the first carriage means during movement of the latter in one direction, a second pair of electric motive means for rotating the respective eccentric bearings for the third roll means, the stop means for limiting movement of the first carriage means along the ways being carried by the second carriage means, second means responsive to movement of the first carriage means to a predetermined position for initiating preparation of a second circuit to energize the second pair of electric motive means, and means rendered operative after actuation of the second initiating means and including time delay means for completing the circuit to energize the second pair of electric motive means to rotate the respective eccentric bearings for the third roll means.

19. Coater apparatus or the like as defined in claim 17 including third roll means mounted at the opposite ends thereof in rotatable eccentric bearings carried by second carriage means slidable on the ways and adapted to be engaged by the first carriage means during movement of the latter in one direction, a second pair of electric motive means for rotating the respective eccentric bearings for the third roll means, the stop means for limiting movement of the first carriage means along the ways being carried by the second carriage means, second means responsive to movement of the first carriage means to a predetermined position for initiating preparation of a second circuit to energize the second pair of electric motive means, means rendered operative after actuation of the second initiating means and including time delay means for completing the circuit to energize the second pair of electric motive means to rotate the respective eccentric bearings for the third roll means, electrical means for increasing the torque exerted by the two torque motors, when energized, third means responsive to the movement of the respective eccentric bearings for the third roll means to predetermined positions for initiating preparation of a circuit to actuate the electrical torque increasing means, second time delay means rendered operative upon actuation of the third initiating means for completing the circuit to actuate the torque increasing means after a predetermined time has elapsed, thereby moving both the first and second carriage means along the ways, second stop means for limiting movement of the second carriage means in one direction, and third time delay means for disabling the circuit to energize the second pair of motive means.

20. In coater apparatus or the like, the combination of a first pair of rotatable rolls mounted for relative movement towards and away from one another, a first pair of electric motive means for producing relative movement between said respective rolls, a second pair of rotatable rolls mounted for relative movement towards and away from one another, a second pair of electric motive means for producing relative movement between the second pair of rolls, an electrical control system for energizing the first and second pairs of electric motive means automatically in predetermined sequence to produce by such motive means relative approaching movement between the rolls in the first and second pairs in corresponding sequence, and electrical control means responsive to at least one abnormal operating condition for automatically energizing the first and second pairs of electric motive means to cause relative separating movement between the rolls in the first and second pairs.

21. In apparatus for coating paper and the like sheet material, an applicator roll for applying coating composition to such material; gate roll means for metering the coating composition; a plurality of distributor rolls for distributing the metered coating composition and transferring same to said applicator roll; carriage means for said gate roll means, said carriage means including a carriage for supporting said gate roll means as a separate group, and supporting means upon which said carriage is movably mounted; another and separate carriage means for said distributor rolls, said other carriage means including a carriage for supporting said distributor rolls as a separate group and supporting means upon which the latter carriage is movably mounted; said carriage means providing means whereby said rolls can be moved to withdrawn positions relative to said applicator roll; and eccentric bearing means upon said distributor roll carriage for preselected ones of said distributor rolls for separating same to discontinue the transfer of the coating composition from one to another.

22. In apparatus for coating paper and the like sheet material, an applicator roll for applying a coating composition to the paper; gate roll means for metering the coating composition; a plurality of distributor rolls for distributing the metered coating composition and transferring same to said applicator roll; carriage means for said gate roll means and separate carriage means for said distributor rolls, said separate carriage means enabling same to be moved to a withdrawn position relative to said applicator roll, said gate roll carriage means including a carriage for supporting said gate roll means as a separate group and supporting means upon which said carriage is movably mounted; said distributor roll carriage means including a carriage for supporting said distributor rolls as a separate group and supporting means upon which said last-mentioned carriage is movably mounted; eccentric bearing means upon said distributor roll carriage for preselected ones of said distributor rolls; and means for actuating such eccentric bearing means thereby causing said distributor rolls to be separated to discontinue the transfer of coating composition from one such roll to another.

23. In apparatus for coating paper and the like sheet material, an applicator roll for applying a coating composition to paper and to such material; gate roll means for metering the coating composition; a plurality of distributor rolls for distributing the metered coating composition and transferring same to said applicator roll; carriage means for said gate roll means; separate carriage means for said distributor rolls; said two carriage means providing means whereby said gate roll means and distributor rolls can be moved each to a retracted position relative to said applicator roll; said gate roll carriage means including a carriage for supporting said gate roll means as a separate group and supporting means upon which such gate roll carriage is movably mounted; said separate distributor roll carriage means including a carriage for supporting said distributor rolls as a separate group and supporting means upon which such distributor roll carriage is movably mounted; and means for spreading said distributor rolls relative to one another to discontinue the transfer of the coating composition from one such roll to another.

24. In a machine for coating a continuously advancing web of paper or the like sheet material which comprises in combination, an applicator roll for applying a coating composition to such web; gate roll means for metering the coating composition; a plurality of distributor rolls for distributing the metered coating composition for transferring same to said applicator roll; a distributor roll carriage for supporting said distributor rolls as a separate group; a separate carriage for said gate roll means for supporting said gate roll means as a separate group; inclined supporting means which slope away from said applicator roll and upon which said carriages are movably mounted; adjustable stop means for limiting the movement of said carriages toward one another, said carriages being movable to withdrawn positions relative to said applicator roll whereby said distributor rolls are movable as a group and said gate roll means are also movable as a group, each to a separate withdrawn position; adjustable limit-stop means for limiting the movement of said distributor roll carriage upon said supporting means toward said applicator roll; and means for mounting said distributor rolls upon said distributor roll carriage for spreading said distributor rolls relative to one another thereby permitting same to discontinue the transfer of the coating composition from one such roll to another.

25. In a machine for coating a continuously advancing web of paper or the like sheet material, an applicator roll for applying coating composition to such web, gate roll means for metering the coating composition, a plurality of distributor rolls for distributing the metered coating composition and transferring same to said applicator roll, a distributor roll carriage for supporting said distributor rolls as a separate group, a separate carriage for said gate roll means for supporting said gate roll means as a separate group, said separate carriages being provided whereby said distributor rolls and gate roll means are separately withdrawable as separate groups to separate retracted positions relative to said applicator roll, adjustable stop means for limiting the movement of said gate roll carriage toward said distributor roll carriage, adjustable stop means for limiting the movement of said distributor roll carriage toward said applicator roll, and shiftable bearing support means upon said distributor roll carriage for at least one of said distributor rolls for moving such rolls relative to the ones next adjacent thereto to open and close the nips therebetween.

26. In apparatus for coating paper and the like sheet material, an applicator roll for applying a coating composition to a web of such sheet material; a carriage; a plurality of distributor rolls mounted upon said carriage as a separate group; at least one of said distributor rolls being in contact with said applicator roll, said distributor rolls being consecutively in contact with one another; a gate roll carriage; gate roll means mounted upon said gate roll carriage as a separate group; inclined supporting means for said carriages, said supporting means sloping downwardly from said applicator roll, said carriages being slidably mounted thereupon; limit-stop means for controlling the extent of sliding motion of said distributor roll carriage upon said supporting means and including adjustable limit-stop means for limiting the movement thereof toward said applicator roll; adjustable limit-stop means for limiting the movement of said carriages toward one another; and power means for controlling the movement of said gate roll carriage upon said support.

27. In a machine for coating a continuously advancing web of paper and the like sheet material which comprises in combination, an applicator roll for applying a coating composition to such web; means for applying a coating composition to said applicator roll including a plurality of single distributor rolls and gate roll means; a distributor roll carriage for mounting all of said distributor rolls as a separate group; a single separate carriage for said gate roll means for mounting same as a separate group; inclined supporting means which slope downwardly from said applicator roll and upon which said carriages are movably mounted; adjustable stop means for limiting the movement of said carriages toward one another; electrically operable motive means for adjusting the position of said last-mentioned stop means; adjustable limit-stop means for limiting the movement of said distributor roll carriage upon said inclined supporting means in at least one direction; electrically operable motive means for adjusting the position of said limit-stop means; shiftable bearing support means for preselected ones of said distributor rolls for moving, when actuated, such rolls relative to one another for opening and closing the nips therebetween; electric motive means operatively associated with said shiftable bearing support means for actuating same; means for actuating said electric motive means in preselected sequence; and adjustable stop means for limiting the movement of each of such preselected distributor rolls in a nip closing direction.

28. In a machine for coating a continuously advancing web of paper and the like sheet material which comprises in combination, an applicator roll for applying a coating composition to such web; means for applying a coating composition to said applicator roll including a plurality of distributor rolls and gate roll means; a distributor roll carriage; a carriage for said gate roll means; inclined supporting means which slope downwardly and away from said applicator roll and upon which said carriages are movably mounted; adjustable stop means for limiting the movement of said carriages toward one another; motive means for adjusting the position of said last-mentioned stop means; adjustable limit-stop means for limiting the movement of said distributor roll carriage upon said inclined supporting means towards said applicator roll; motive means for adjusting the position of said limit-stop means; shiftable bearing support means for preselected ones of said distributor rolls constructed and arranged for moving such preselected rolls for opening and closing the nips between said distributor rolls; adjustable stop means for limiting the movement of each of such preselected distributor rolls in a nip closing direction; motor means operatively associated with said shiftable bearing support means for actuating same; motor means operatively associated with said carriages for moving same upon said supporting means; and means for actuating said motor means in preselected sequence.

29. In a machine for coating paper and the like sheet material, a pair of oppositely drivable rolls, including an applicator roll, between which a web of paper can pass; means for applying a film of coating material to the surface of one of such rolls whereby said film is transferred to the web, said means including a pair of carriages movable relative to one another, a series of contacting distributor rolls carried by one of said carriages, one of such rolls normally contacting said applicator roll, metering means carried by the other of said carriages for applying a metered quantity of coating material to said distributor rolls, an inclined support for said carriages the latter being slidably mounted thereupon, adjustable means for limiting the movement of said carriages toward one another, adjustable means for limiting the movement of the distributor roll carriage next adjacent said applicator roll toward the latter, means responsive to a breaking of the web for the withdrawing of said metering means carriage a preselected distance away from said applicator roll, and means for limiting the movement of said distributor roll carriage upon said support away from said applicator roll a distance less than said preselected distance.

30. In apparatus for coating paper and the like sheet material, an applicator roll for applying coating composition to the paper and such material, gate roll means for metering the coating composition, a plurality of distributor rolls for distributing the metered coating composition and transferring same to said applicator roll, carriage means for said gate roll means, carriage means for said distributor rolls, said carriage means permitting said gate roll means and distributor rolls to be moved to withdrawn positions relative to said applicator roll, eccentric bearing means for a plurality of said distributor rolls permitting same to be separated to discontinue the transfer of the coating composition from one to another, nip closing sequence control means including carriage power means for urging said gate roll means into contact with a next adjacent distributor roll, means for thereafter actuating said eccentric bearing means for consecutively closing the nips between said distributor rolls starting with such nip next adjacent said gate roll means, said carriage power means being thereafter effective to urge one of said distributor rolls into contact with said applicator roll.

References Cited in the file of this patent
UNITED STATES PATENTS

| Number | Name | Date |
| --- | --- | --- |
| 1,409,908 | Affelder | Mar. 21, 1922 |
| 2,060,755 | Exner | Nov. 10, 1936 |
| 2,105,488 | Massey et al. | Jan. 18, 1938 |
| 2,244,859 | Thiele et al. | June 10, 1941 |
| 2,244,880 | Howse | June 10, 1941 |
| 2,257,261 | Knowlton | Sept. 30, 1941 |
| 2,329,263 | Gladfelter et al. | Sept. 14, 1943 |
| 2,487,702 | Goodwillie et al. | Nov. 8, 1949 |
| 2,556,032 | Faeber | June 5, 1951 |